(12) United States Patent
Cunningham et al.

(10) Patent No.: US 6,219,786 B1
(45) Date of Patent: Apr. 17, 2001

(54) METHOD AND SYSTEM FOR MONITORING AND CONTROLLING NETWORK ACCESS

(75) Inventors: Mark Cunningham, Leek; Andrew Trevarrow, Withington, both of (GB)

(73) Assignee: SurfControl, Inc., Scotts Valley, CA (US)

( * ) Notice: Subject to any disclaimer, the term of this patent is extended or adjusted under 35 U.S.C. 154(b) by 0 days.

(21) Appl. No.: 09/150,264

(22) Filed: Sep. 9, 1998

(51) Int. Cl.$^7$ .................................................. G06F 13/00
(52) U.S. Cl. .................. 713/152; 713/201; 713/153; 709/229
(58) Field of Search .................................. 713/200, 201, 713/202, 151, 152, 153; 709/229; 340/825.31, 825.34

(56) References Cited

U.S. PATENT DOCUMENTS

| | | | |
|---|---|---|---|
| 5,720,033 | 2/1998 | Deo | 395/186 |
| 5,727,146 | 3/1998 | Savoldi et al. | 395/187.01 |
| 5,742,759 | 4/1998 | Nessett et al. | 395/187.01 |
| 5,826,014 | * 10/1998 | Coley et al. | 713/201 |
| 5,835,722 | 11/1998 | Bradshaw et al. | 395/200.55 |
| 5,884,033 | 3/1999 | Duvall et al. | 395/200.36 |
| 5,889,958 | * 3/1999 | Willens | 709/229 |
| 6,061,798 | * 5/2000 | Coley et al. | 713/201 |

* cited by examiner

Primary Examiner—James P. Trammell
Assistant Examiner—Pierre Eddy Elisca
(74) Attorney, Agent, or Firm—Terry McHugh; Law Offices of Terry McHugh

(57) ABSTRACT

A method and system for monitoring and controlling network access includes non-intrusively monitoring network traffic and assembling data packets that are specific to individual node-to-node transmissions in order to manage network access both inside and outside of a network. A rules base is generated to apply at either or both of the connection time and the time subsequent to connection. With regard to a particular node-to-node transmission, the data packets are assembled to identify the source and destination nodes, as well as contextual information (i.e., ISO Layer 7 information). The access rules are applied in a sequential order to determine whether the transmission is a restricted transmission. The rules are maintained in a single rules base for the entire network and are distributed to each monitoring node. Any of the protocols in the suite of TCP/IP protocols can be managed. The result of an analysis against the rules base causes a connection attempt to be completed or denied, a previously established connection to be broken, logging to occur, or a combination of these and other actions. Data collected during connection attempts or during a connection's lifetime may be passed to a third-party hardware or software component in order for independent validation to take place. Traffic monitoring and access management can be executed at a node other than a choke point of the network.

18 Claims, 7 Drawing Sheets

METHOD AND SYSTEM FOR MONITORING AND CONTROLLING NETWORK ACCESS

TECHNICAL FIELD

The invention relates generally to a method and system for managing access control to resources of a distributed network, and relates more particularly to monitoring and controlling computer users' access to network resources from both inside and outside the network.

BACKGROUND ART

There are a number of available topologies for computer networks of nodes. A computer network may be highly centralized, having a mainframe computer that is accessed by a number of user computers, such as desktop computers. Currently, the trend is away from centralization and toward distributed processing and client-server relationships. In a distributed network, intelligence and processing power are distributed among a number of network nodes, typically with client workstations communicating with distributed servers. Other relationships among nodes of a network are known.

A network of nodes may be associated with a single enterprise, such as a local area network (LAN) of a particular business. Such a network enables communications and data exchanges among the various nodes of the network. A single protocol may be used in the accessing of resources within the LAN. Thus, when a first node, such as a client workstation, accesses the computing resources of a second node, such as a server for storing various applications, data is exchanged without requiring a protocol conversion.

However, the largest and most pervasive network is the nonproprietary global communications network referred to as the Internet. A number of different network protocols are used within the Internet. Protocols that fall within the Transmission Control Protocol/Internet Protocol (TCP/IP) suite include the HyperText Transfer Protocol (HTTP) that underlies communications via the World Wide Web, TELNET for allowing access to a remote computer, the File Transfer Protocol (FTP), and the Simple Mail Transfer Protocol (SMTP) to provide a uniform format for exchanging electronic mail, as well as a number of standardized or proprietary protocols for multimedia and broadcast services.

An implementation of these and other Internet protocols solely within an organization is often referred to as an Intranet, while the use of such protocols across a restricted set of Internet sites that are relevant to a particular organization is referred to as the organization's Extranet.

Much attention has been given to installing computer network gateways which focus on ensuring that potential intruders (sometimes referred to as "hackers") cannot gain illegal access via the Internet to an organization's computing resources on their Intranets. These gateways are "choke points," through which network traffic that is to be controlled must flow. Such "firewalls" are configured to allow any outbound connection or traffic to occur, but to restrict inbound traffic to specific services that are deemed to be non-threatening to the organization. Firewalls may also perform a limited amount of "packet filtering," which attempts to control traffic by reference to non-contextual, low-level network packets.

An issue that receives less attention is ensuring that the employees of an organization are appropriately managed. This management extends to accessing external computer resources and accessing internal computer resources. The management may be set forth in an access control policy of the organization. With respect to many aspects, the management is the converse of the problem that firewalls are intended to solve. While firewalls are focused on keeping intruders from gaining unwanted accesses, access control systems are focused on ensuring that insiders are managed according to the access control policy of the organization.

There are a number of motivations for implementing an access control policy within an organization. With regard to controlling external communications, two important reasons are maximizing employee productivity by ensuring that Internet access is used primarily for business purposes and maximizing the Internet-connection capability (i.e., bandwidth) of the organization, particularly during peak usage times. For example, using streaming audio and video services at peak times of the day in terms of the network traffic of an organization can seriously diminish productivity of other users within the organization who are attempting to perform tasks such as e-mail file transfers, terminal emulations, and network database inquiries.

Using traditional approaches, organizations apply stringent rules and sometimes overbearing management dicta in order to prevent key business usage of the Internet from being adversely affected by casual or inappropriate usage. The traditional approaches are typically administratively difficult to set up and maintain, as well as being difficult to scale from small organizations to large enterprises. Thus, some of the productivity gains are negated by management overhead.

One traditional approach to providing access control with regard to resource requests generated within a network is to leverage firewall technology and focus on the well-known packet filtering techniques. This typically requires a computer system to be installed as a router with at least two network interface cards and with no data packets being allowed to be forwarded from one interface card to the other without prior filtering. That is, firewall technology has been "turned around" to form some degree of protection. Rather than controlling outsiders attempting to access resources of the network, the techniques are used to control insiders attempting to access external resources. This approach may work well in some applications, but in others the approach is too simplistic and inflexible.

U.S. Pat. No. 5,727,146 to Savoldi et al. describes a method for securing network access to a network. All data packets that are transmitted via the network are monitored for authorized source addresses, rather than examining only the initial network connection packets. Thus, network access to a port is secured by monitoring the source address of each packet that is sent as a device tries to train to the port of the network. If the source address matches an authorized source address assigned to the port to which the device is attached, the device is allowed access to the system. However, if the device attempts to train with a source address different from the authorized source address, all packets sent by the device are denoted as errored packets to prevent them from being accepted by any other device in the network. By monitoring all packets, the system detects occurrences in which a device attempts to "disguise" itself by first training with an authorized source address and then sending a packet with an unauthorized source address.

Another approach to implementing network access control is to add third-party software modules into commercially available proxy server products. For example, software modules that are dedicated to attempting to control access may be added to a web proxy server. The disadvantages of this approach include the fact that only a small subset of Internet protocols is actually routed through a web proxy server. These protocols are typically restricted to browser-based FTP, Gopher and WWW protocols. This subset of protocols does not include the protocols used in the transfer of packets for e-mail, telnet, other file transfers, and streaming audio and video. Therefore, using web proxy servers as choke points allows only an incomplete level of control.

Another approach to attempting control access is to establish "blacklists" or "control lists" into proxy servers or into individual client workstations. This is a somewhat simplistic approach to meeting the needs of organizations and is often administratively burdensome to corporations, since the lists must be updated on a regular basis.

What is needed is a method and system for providing access control to resources of a network in a manner that is flexible, scalable and relatively easy to administer.

SUMMARY OF THE INVENTION

A method and system in accordance with the invention are configured to provide access control to resources of a network by collecting and assembling data packets of a specific transmission, so as to enable identification of information from raw data packets at the lowest level to application-level data at the top-most level. In terms of the standardized model referred to as the International Standards Organization (ISO) model, the data packets are assembled to determine not only the lower-layer information from the headers of the packets, but also the uppermost Application Layer (i.e., Layer 7) contextual information. Access rules are then applied to determine whether the specific transmission is a restricted transmission.

In the preferred embodiment, the steps of receiving and assembling the data packets occur non-intrusively with respect to impact on traffic flow through the network. That is, the data packets are intercepted without impact on network performance, unless a restricted transmission is detected. Receiving and assembling the data packets may occur at a workstation or server that is dedicated to providing access control. For example, a free-standing workstation may be connected as a node to the network and may be switched to a promiscuous mode in order to receive all data packets transmitted to or from other nodes of the network. This allows the workstation to receive the fragments (i.e., data packets) of each access attempt from elsewhere on the network to either external destinations or other internal destinations. The fragments are pieced together to identify ISO Layer 7 information, as well as lower layer information. In an e-mail context, the Application Layer information of interest may include the information contained within the "to," "from" and "subject" lines of e-mail messages. In a web context, the Application Layer information of interest may include the text of the HTML pages.

By placing the dedicated workstation or server outside of the direct paths from source nodes to destination nodes, the impact on network traffic is minimal. However, the method and system may also be implemented by examination and management at a choke point, such as a proprietary proxy server, a firewall or other network node that is acting as a gateway between the network and an external network (e.g., the Internet). The examination and management at a choke point may take the form of a plug-in module for receiving, assembling and examining data packets in the manner described above. However, the examination of access attempts at the choke point will not provide the level of access control available by monitoring all traffic within the network, and may well impact network performance. Therefore, the system may include both access monitoring at the choke point and non-intrusive monitoring elsewhere on the network.

In the approach in which access is examined non-intrusively, the dedicated workstation or server may be configured as a "bare-bones" TCP/IP virtual machine to establish a capability of providing information extending from the lower layers of the ISO model to the Application Layer. There may be more than one dedicated workstation or server, particularly if the network is divided into segments. The access rules are preferably stored as a rules base, which may be centralized if there is more than one node that provides access management. Alternatively, the rules base is configured at a single site, but then automatically distributed to each access control point on the network.

The access control rules may apply at the time that a connection is established or may depend upon application protocol data following a successful connection. In the preferred embodiment, the rules are applied both at the time of connection and subsequent to the connection, as data packets are assembled. If a node-to-node transmission is determined to be a transmission that is restricted by the rules base, a connection attempt may be denied, a previously established connection may be broken, a simple logging may occur, or a combination of these actions may be implemented. Data collected during the connection attempts or during a connection's lifetime may be passed to third-party software in order for independent validation to occur. However, this is not critical.

The rules base is preferably divided into two sets of rules. The first set relates to access management requirements with regard to outgoing connection attempts, while the second set relates to internal connection attempts. The rules within each set may be layered in order to allow seemingly inconsistent rules to be included in a single rules base. For example, rules within a particular set may be applied sequentially, so that a specific rule application is accessed prior to a general rule application that contradicts the specific rule. The rules base is preferably configured in terms that are familiar to users, such as usernames, group names, workstation identifiers, destination addresses and URLs, services required, time-of-day, day-of-week, and data size.

An advantage of the invention within a business environment is that the method and system protect employee productivity by ensuring that Internet access is used primarily for business purposes. Another advantage is that the bandwidth availability is used more efficiently. Access may be dynamically controlled based upon factors such as the time of day and the day of the week. Another advantage is that internal security is enhanced by ensuring that access to internal computer resources is managed.

DETAILED DESCRIPTION

Figure 1:
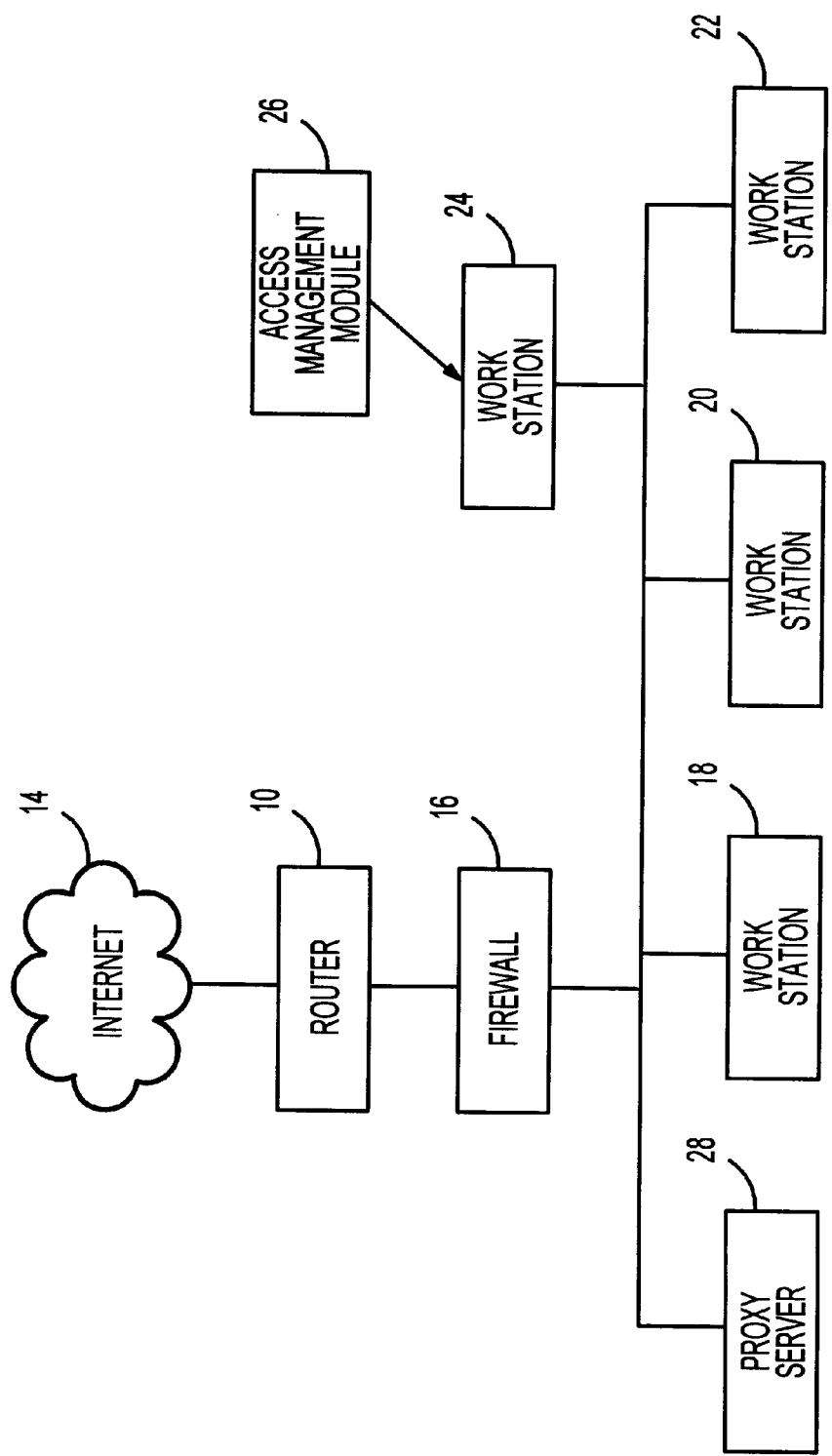
FIG. 1 is an exemplary topology of a network that utilizes access control management in accordance with the invention.

With reference to FIG. 1, an exemplary network is shown as including a router 10 that provides access to the global communication network referred to as the Internet 14 for an organization that is protected from unwanted intruders by a firewall 16. A number of conventional user workstations 18, 20 and 22 are included as nodes of the network. A fourth workstation 24 may be identical to the other workstations, but is dedicated to providing access control management. Thus, the workstation 24 is an access control management console (ACMC). However, one of the other workstations may be used to implement the access rules in a manner that is consistent with the non-intrusive management system to be described below. The workstation 24 may be a conventional desktop computer having a plug-in access management module 26 to monitor traffic within the network.

Another node within the network is a proprietary proxy server 28 that is used in a conventional manner to enable selected services, such as web services. A web proxy server is designed to enable performance improvements by caching frequently accessed web pages. While such servers tend to add some access control potential by taking advantage of the fact that all HTTP conversions are being channeled through the service, the access control functionality is not a primary focus and only a subset of the protocols that are likely to be encountered via the Internet will be recognized by conventional web proxy servers. For example, the proxy server 28 may provide proxying capability for the HTTP protocol and perhaps browser-based FTP and Gopher, but the proxying capability is not likely to extend to other TCP/IP application protocols, such as telnet, news, e-mail and many proprietary multimedia protocols.

The network topology of FIG. 1 is shown as an exemplary configuration and is not meant to limit or constrain the description of the invention. The method and system to be described below can operate on a wide variety of network configurations. Moreover, while all workstations 18–24 can be presumed to be running the Microsoft Windows operating system and all servers 28 can be assumed to be running the Microsoft Windows NT Server operating system, the invention is not specific to any one operating system. Although the prime use of the method is anticipated as being applied to networks using the TCP/IP protocols, it can be readily adapted to function with any other set of networking protocols, such as Novell IPX/SPX or IBM NetBEUI.

It is also assumed that the network for which access management is to be provided includes a number of users, groups of users and workstation addresses. All of these items are assumed to have been pre-configured using known configuration methods provided by the supplier of the network operating system. Although implementation of the invention may be based on data such as usernames and group names from a network operating system or similar repository, there is no dependency on a specific network operating system or a specific mechanism to access such data. Employing usernames and group names that are consistent with other system operations takes advantage of any familiarity that may already exist with this information. Furthermore, in the absence of any such information, the invention may utilize other naming nomenclature, such as IP or Ethernet addresses.

Figure 2:
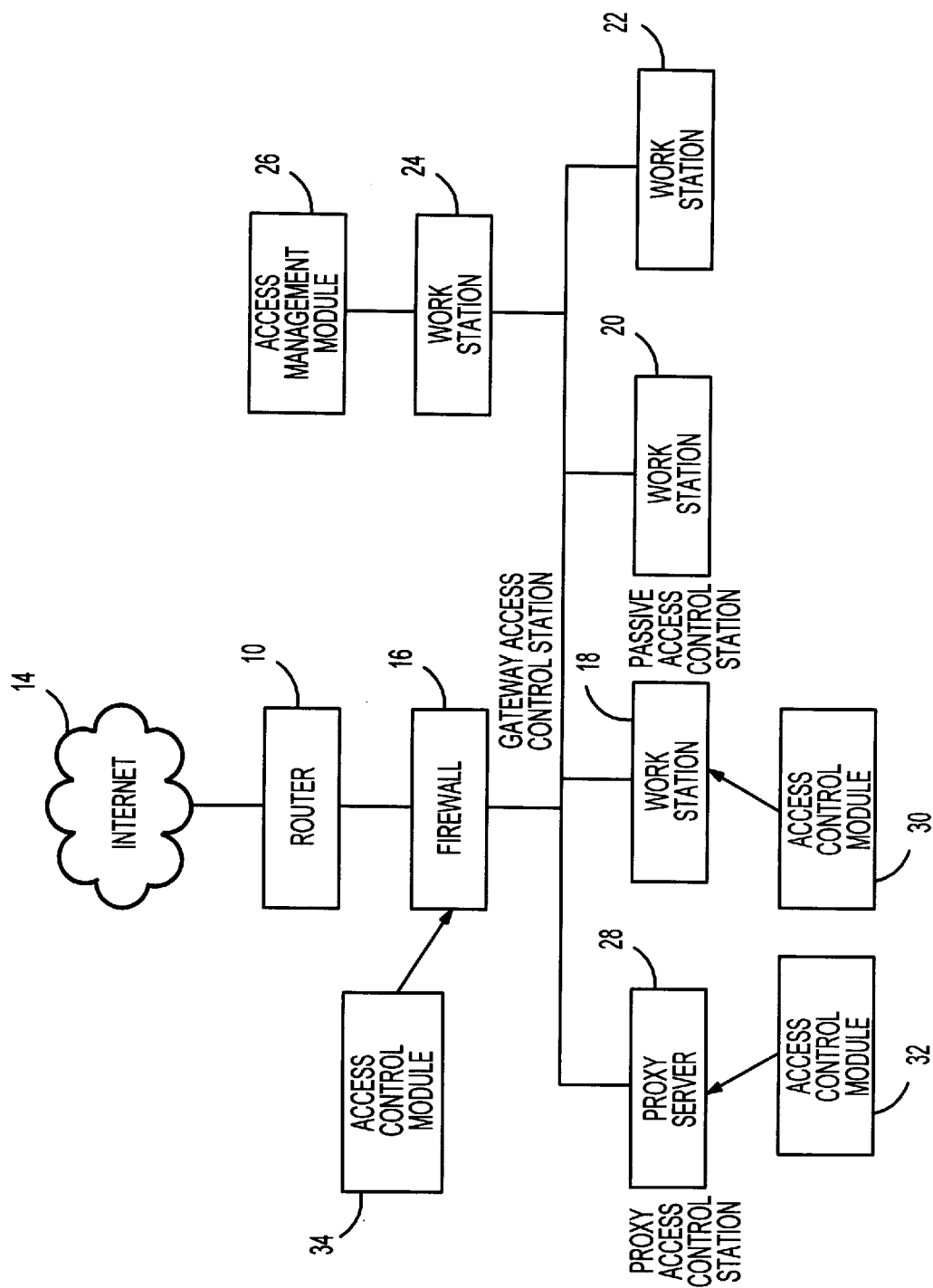
FIG. 2 is a block diagram of an exemplary network topology having more than one node that establishes access control in accordance with the invention.

Referring now to FIG. 2, a first access control module 30 has been installed on the workstation 18 to enable the workstation to function as a passive access control station (PACS). A second instance of an access control module 32 is installed on the proxy server 28, so that this node functions as a proxy access control station (PRACS). Moreover, a third instance of an access control module 34 is installed on the firewall 16 in order to form a gateway access control station (GACS). A key point in the system and method is that the individual workstations 20 and 22 that are accessed by users can be managed without installing any software components specifically on those workstations. Network traffic is monitored and access to internal and external resources is controlled and managed either at choke points (represented by the proxy server 28 and the firewall 16) and/or non-intrusively at nodes which are not choke points (represented by the workstation 18). The access control modules 30, 32 and 34 can be installed, de-installed, and reinstalled on any of the nodes of the network at any time to suit potentially changing network topologies or changing access management policies.

The location and configuration of each of the access control modules 30, 32 and 34 are selected by an installer based upon pragmatic factors in order to achieve a level of access control that is consistent with the access management policy. As previously noted, the first access control module 30 is not required, since the workstation 24 may serve the dual purpose of allowing a system operator to configure the rules base of access rules and non-intrusively monitoring traffic along the network. The second access control module 32 is optionally used in order to ensure that access is managed for all users who are accessing the WWW by configuring web browsers to operate via the proxy server 28. The third access control module 34 is optionally installed at the firewall 16 in order to validate that both the firewall and the other access control modules have indeed been configured correctly and are performing their desired duties. Firewalls are sometimes difficult to configure, so organizations are increasingly adding second-line checks to their networks to ensure that absolute integrity is being maintained. However, the non-intrusive monitoring at the dedicated workstation 18 is capable of monitoring and controlling all access from all nodes on the network, regardless of TCP/IP protocol. This mechanism can be used to manage all network access that is not routed via the proxy server 28 with a high degree of probability that undesired access can indeed be blocked. Network traffic is non-intrusively monitored, but the system and method may be used to proactively block any requests for resources.

Figure 3:
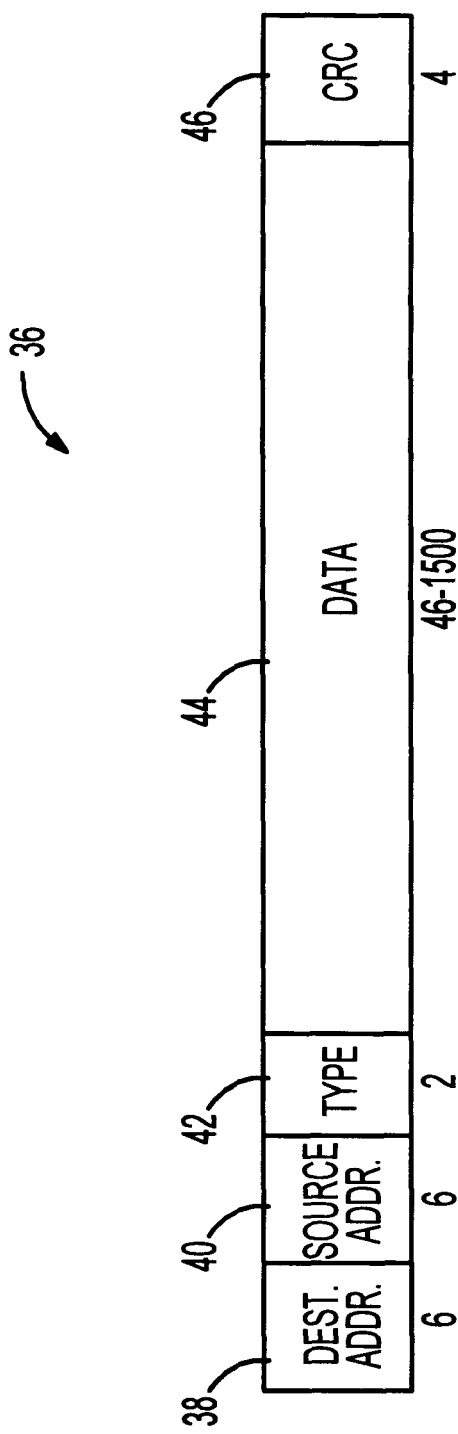
FIG. 3 is a prior art schematic diagram of an Ethernet data packet.

The non-intrusive monitoring of network traffic at the workstation 18 occurs by receiving and assembling data packets of node-to-node transmissions. Modern networks, including the Internet, are packet switching networks in which a transmission is separated into data packets which are separately transmitted to a destination node. At the destination node, the packets are assembled to form the original composite signal. FIG. 3 depicts an Ethernet data packet according to RFC base 894. Traffic along the network of FIGS. 1 and 2 may be in the form of transmissions of Ethernet packets. Each Ethernet packet 36 includes five segments. A first 6-byte segment 38 identifies the destination node address, while a second 6-byte segment 40 identifies the address of the source node. The third segment 42 is a 2-byte segment that identifies the protocol type. A data field 44 has a variable length, with a maximum of 1500 bytes. The data field 44 contains the user information. Finally, the fifth segment 46 is a checksum field that is used for error detection and correction purposes.

As is well known in the art, other standards for packetization are utilized. For example, each header that is used in a TCP transmission or a UDP (User Datagram Protocol) transmission includes a 16-bit destination port number. An Ethernet packet having a TCP/IP packet or UDP/IP packet embedded in its data field will include three designations: (1) the Ethernet addresses of the source and destination nodes; (2) the IP addresses of the source and destination nodes; and (3) the IP port number of the destination node. Other protocols are present and operational in TCP/IP networks and control operations such as routing and the translation of IP addresses to and from hostnames. A protocol referred to as ARP (Address Resolution Protocol) also maps IP addresses to Ethernet addresses.

By intercepting the Ethernet packet 36 of FIG. 3, the destination address, the source address and the user data are available to the monitoring node. For the non-intrusive monitoring that occurs at the workstation 18 of FIG. 2, the workstation may be placed in the promiscuous mode and there will be no impact on performance of the network. However, the packets that are specific to a particular node-to-node transmission can be collected and assembled merely by configuring the access control module 30 such that the workstation functions as a bare-bones TCP/IP protocol virtual machine. The workstation then has the capability of piecing together the fragments of a multi-packet signal. This enables access management control to base decisions upon information from various levels of the ISO model—from the lower layers to the uppermost Application Layer.

Figure 4:
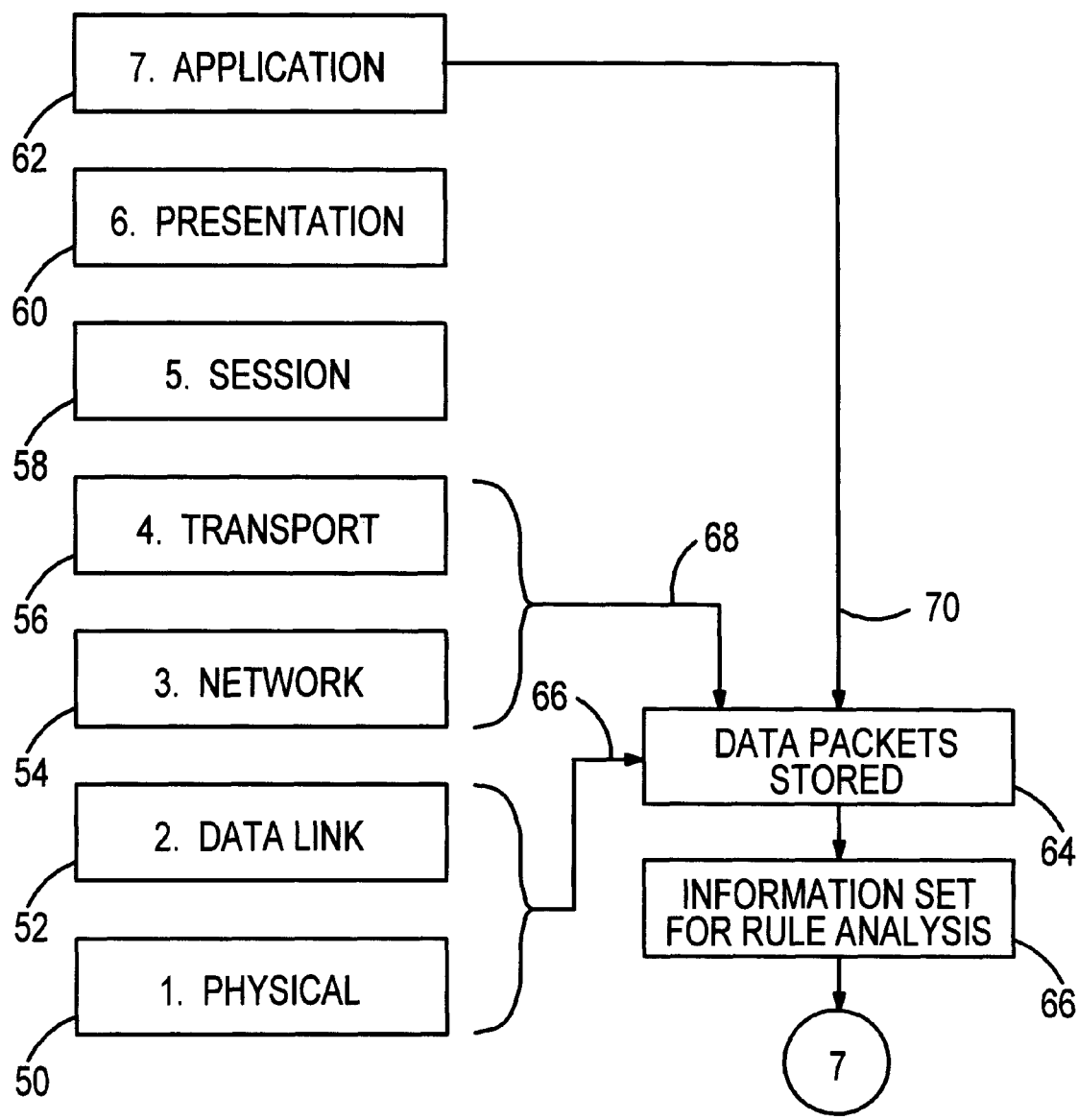
FIG. 4 is a schematic view of the seven-layer ISO model and the source layers that are utilized by the invention.

Communications protocols are a layered set, often referred to as a "stack." The International Standards Organization (ISO) has developed a model referred to as the ISO 7-layer model, which serves as a basic reference. Each layer represents a particular function. The function of a particular layer may be executed in hardware or software or a combination of hardware and software. At times, a single program performs the functions of more than one layer. FIG. 4 illustrates the seven layers of the ISO model. The lowermost layer, referred to as the Physical Layer 50, is the hardware network connection, such as a physical wire. ISO Layer 2, the Data Link Layer 52, is responsible for providing reliable transmissions of data. Layer 2 may be a network interface card that links a computer to the network.

ISO Layer 3, the Network Layer 54, is the network software for routing packets throughout the network. ISO Layer 4, the Transport Layer 56, transports data from the network to the upper levels of the ISO model.

ISO Layer 5, the Session Layer 58, deals with establishing network sessions. Logical connections are established based upon a request of a user. ISO Layer 6, the Presentation Layer 60, deals with the presentation of data to an application which resides at ISO Layer 7, the Application Layer 62. Examples of the Application Layer include FTP, HTTP and SMTP. Layer 7 provides access to the Internet for a user.

FIG. 4 illustrates three inputs to a step 64 of storing data packets. The first input 66 represents the actual input of data packets, while the second and third inputs 68 and 70 are operational representations. Referring to FIGS. 2 and 4, the workstation 18 that non-intrusively monitors network traffic receives inbound and outbound data packets through Layers 1 and 2. As previously noted, the network interface card of Layer 2 is set to the promiscuous mode, so that the data packets of the network are received over the Physical Layer 50. Optionally, the rules base of the access management module 26 may be utilized more than one time. In a first application of the rules base, the first packet of a resource request may be used to detect the source and destination nodes, allowing access determinations to be based on this low-level information. However, higher level decisions can be formed only after a connection has been established and the actual content has begun to flow over that connection. This is in contrast to conventional operations of firewalls, which typically only act as low-level packet filters (i.e., at ISO Layer 2).

As indicated by the input 68, the invention includes assembling the data packets to detect information at the Transport Layer 56 and the Network Layer 54 of the ISO model. Moreover, Layer 7 information is acquired by assembling the data packets, as represented by the input 70. For example, in an e-mail environment, the Application Layer information that may be relevant to application of the rules base may include information within the "subject" line of an e-mail message. This information is acquired only upon accessing the data fields of the data packets of the e-mail message. At step 66, the necessary information has been acquired for applying the rules base. As previously noted, the application may occur more than once for a single multi-packet transmission. The desirability of providing single or multiple rules applications may depend upon a number of factors.

Figure 5:
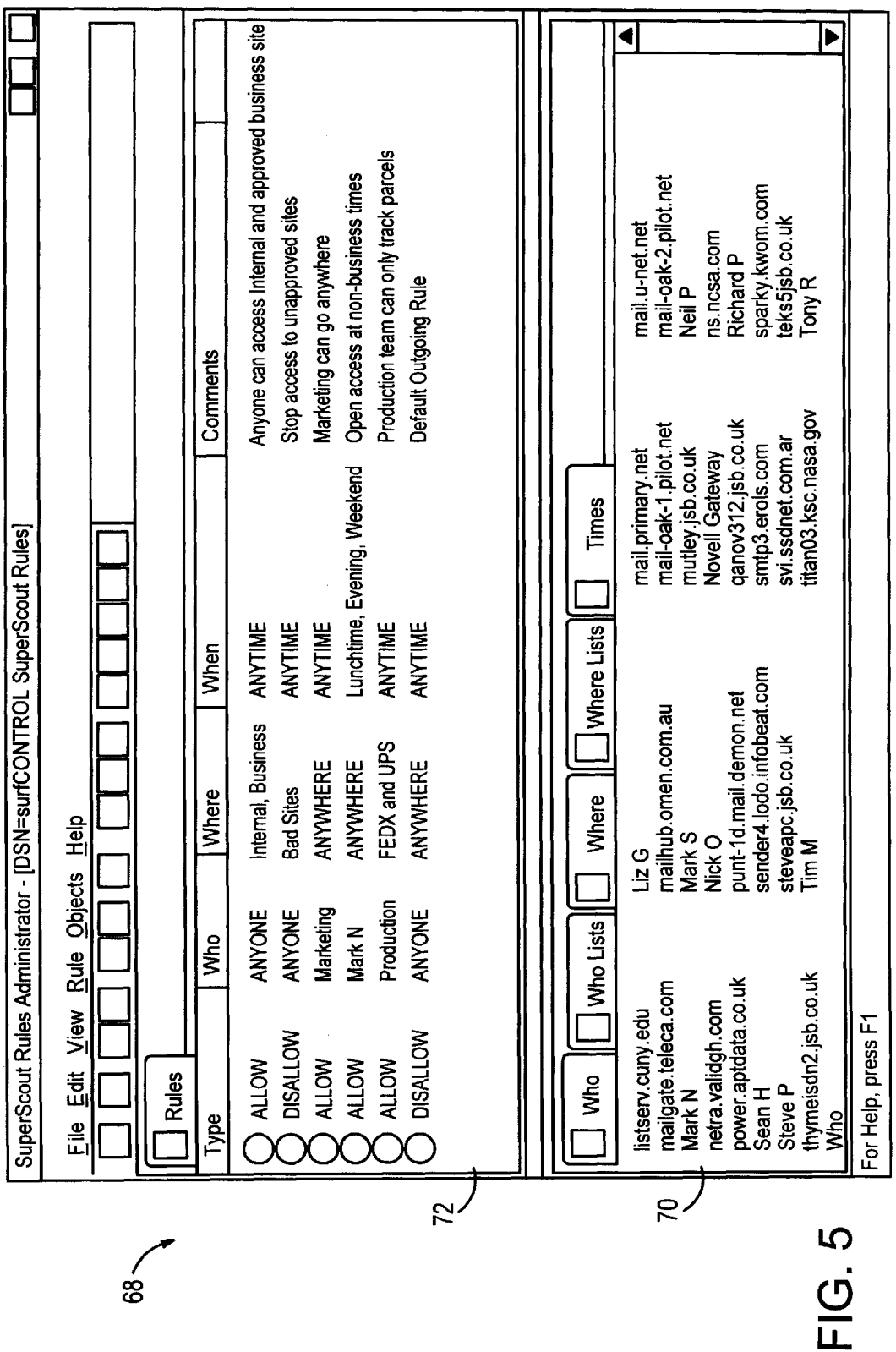
FIG. 5 is a view of a graphical user interface (GUI) in accordance with one embodiment of rules configurations.

Referring now to FIG. 5, an embodiment of a graphical user interface (GUI) 68 is shown for use by a system operator to configure the rules base that determines the action of the access control modules 30, 32 and 34 of FIG. 2. The action of each access control module is determined by rules configured at the ACMC 24, which includes the access management module 26. The management module presents the GUI 68, although this is not critical to the invention.

In the preferred embodiment, the rules base is comprised of a twin set of ordered rules. One of the sets of rules relates to access management requirements for outgoing access, while the second set relates to inbound connection attempts. Within each set, the rules are in a sequence that dictates the sequence in which the rules are considered. This sequencing ensures that rules are applied in a specific deterministic order, allowing the system operator to layer more specific rules ahead of more general rules. Thus, seemingly inconsistent rules can be established. For example, a rule may be configured to give User A access to a certain resource ahead of a rule banning everyone in the organization from accessing that resource. This has the effect of allowing access by User A and blocking access to that resource by all other users.

After a rules base has been configured by a system operator, the rules base is downloaded to the access control modules 30, 32 and 34. Thus, any subsequent changes in the rules base may be implemented at the various nodes in an efficient dynamic manner.

Regarding the configuration of the rules, various objects may be utilized to provide a more granular or less granular rule. Affected parties may be designated by usernames and group names (both typically from the network operating system), ad hoc groupings of users, and workstation addresses. Other objects include network services, source addresses (IP address, hostname or URL), destination addresses (IP address, hostname or URL) and time-slot specifiers (time of day, day of week, etc.). These objects are graphically dragged and dropped onto each rule, as required in order to dynamically and graphically build up the rule within the overall rules base. Against each rule, an action is configured to specify the resulting action that should be performed if a rule is matched at runtime. Potential actions include (1) disallowing the connection attempt, (2) allowing the connection attempt to be completed, (3) passing off the decision-making on whether the connection should be allowed or disallowed to a third-party component (which may, for example, consult a control list or perform other checks), (4) allowing the connection, but performing further analysis on the data stream in order to determine whether a connection should be broken at some future point (e.g., based upon the number of bytes that are transferred), and (5) performing further collection of the data stream and passing off the collection to a third-party component for further analysis (e.g., an anti-virus product).

Rules can be amended, deleted or reordered using the graphical user interface 68 of FIG. 5. The rules base is stored in an internal format that is then made available to the various access control modules 30, 32 and 34, as described above.

The graphical user interface 68 is divided into two portions. The lower portion 70 is used to define network objects, such as usernames, groups, workstations and other such entities mentioned above. This information is built up by the system operator, but as much information as possible is gleaned from the network operating system. Typically, all usernames, group names and workstation addresses are established via reference to the network operating system. It is also possible to form ad hoc groupings for ease of use, such as groupings of users that are not configured or that are configured differently in the network operating system. Object-oriented technology simplifies the definition process by allowing operational parameters to be defined for object classes, rather than each individual network element. It is thus possible to perform access control at a detailed level of controlling individual user access and at a more general level of network groups of users or ad hoc groupings of users. This allows the operator to have flexibility in the access management task. It is thus possible to allow different access control criteria to different levels of employees and managers.

Other objects that are defined in the lower portion 70 of the GUI 68 are services, such as e-mail, file transfer, WWW and any of the other possible sets of services allowed in a TCP/IP network. Specific properties of a service include its name and its TCP/IP port number. Certain well-known services are pre-configured for the operator. For example, it is known that the telnet service should be pre-configured on port 23. Any services may, however, be added or modified by the operator.

The upper portion 72 of the GUI 68 contains the rules. The total set of rules is referred to as the rules base. Rules are constructed graphically by the operator by dragging objects from the lower portion 70 and dropping them into specific rules of the upper portion 70. Rule ordering is important and can be changed graphically by dragging a rule to a new position in the sequence. When rules are consulted at runtime, a top-down ordering is implemented. As previously noted, two sets of rules are maintained, one relating to outbound communications and the other relating to inbound communications.

In the preferred embodiment, storage logs are maintained for transaction data. The storage logs may be maintained for all of the transaction data or subsets of the data. The storage logs may then be used for further analysis by built-in or third-party components. However, this is not critical to the invention.

Figure 6:
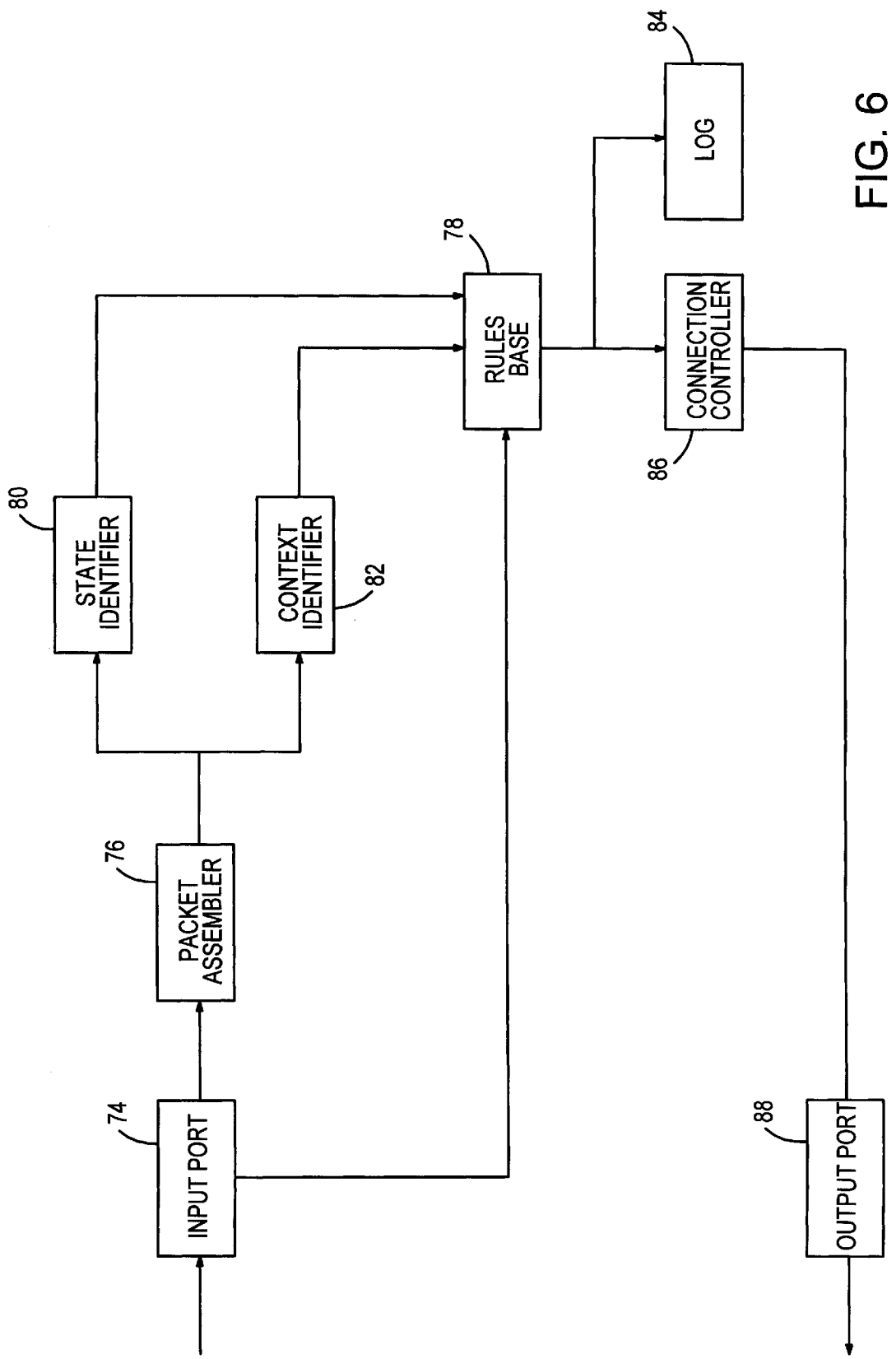
FIG. 6 is a block diagram of one embodiment of an access control device in accordance with the invention.

FIG. 6 is an exemplary arrangement of hardware and software for implementing the network access control system and method. A Passive Access Control Station, such as the workstation 18 of FIG. 2, includes an input port 74 that is placed in a mode to receive all data packets destined for any node on the network. The data packets that are specific to a particular node-to-node transmission are combined at a packet assembler 76. Detailed information from the assembled data packets is stored until sufficient information is acquired regarding the node-to-node transmission to apply the previously configured rules base 70. The process of applying the rules base to the acquired information may occur in a single step or may be a multi-step process. For example, in FIG. 6 there is a state identifier 80 and a context identifier 82. The state identifier is used to determine information regarding the lower layers of the ISO model, while the context identifier 82 acquires higher layer information, including Application Layer information. The rules base 78 may be consulted a first time when the state identifier 80 has acquired sufficient information, and then applied a second time when the context identifier 82 has acquired sufficient higher level information.

It is important to note that information which is stored includes both low level state information and contextual information that is discovered at points in the network stack other than Layers 1 and 2. Full Application Layer awareness is achieved without the need to implement specific application proxies for each service. The two parts of the proxy process are linked in order to accommodate the possibility that proxy connections are being made, since the real source node and the final destination node must be identified to ensure that the correct rule is applied in managing network access.

If it is determined that a particular node-to-node transmission is unrestricted, the transmission is unaffected by the process. Optionally, data regarding the transmission may be stored within a log 84. However, if the transmission is a restricted transmission, any one of a number of actions may be initiated by a connection controller 86. When the connection from a source node to a destination node has not been completed, the connection controller may generate a signal that is output via the output port 88 to an appropriate node (e.g., a router) for preventing the connection. For situations in which the connection is established, the controller 86 may generate a signal that disables the connection. As a third alternative, the connection may be allowed, but further analysis of the data stream may be performed in order to ascertain whether the connection should be disabled at some future time (e.g., based upon the number of bytes that are transferred during the connection). The decision of whether to allow or disallow the connection may be passed to another node, such as a third-party component which consults a control list or performs other checks.

Figure 7:
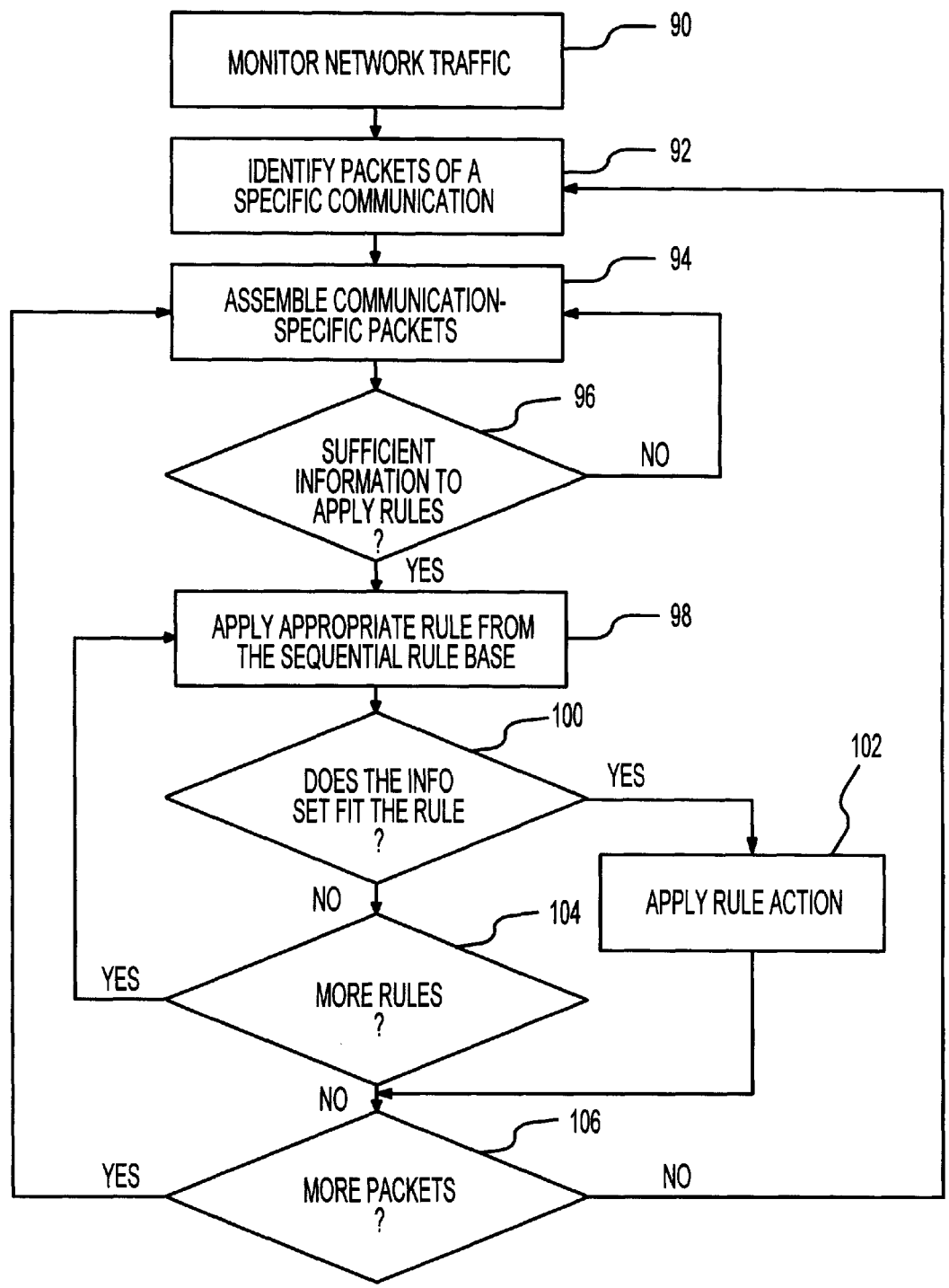
FIG. 7 is a process flow of steps for operating the device of FIG. 6.

FIG. 7 details the steps of providing access control in accordance with the invention. In step 90, network traffic is monitored non-intrusively, such as by the workstation 18 of FIG. 2. Packets that are specific to a particular communication (i.e., node-to-node transmission) are identified in step 92 and assembled in step 94. Decision step 96 determines whether sufficient information has been acquired to apply the rules of the rules base.

When sufficient information has been acquired to apply the rules base, the first rule is consulted to determine if the packet information set matches the rule. As previously noted, the rules base is organized into a first set of outbound-related rules and a second set of inbound-related rules. Moreover, the rules in a particular set are consulted in a top-down order. Thus, the rule that is applied in step 98 is the first rule in the appropriate set of rules. At step 100, a decision is made as to whether the information set fits the rule applied in step 98. If a rule fit is recognized, the appropriate rule action is applied at step 102. The appropriate rule action may be designated within the rules base. If the rule is affirmatively stated (e.g., "allow all HTTP connections"), the action will allow the connection to remain unhindered. Other prescribed actions may include logging information to a database, sending an e-mail message, raising an alert in a pre-established manner, or diverting the data content of the connection to a third-party process which can determine whether the connection should be maintained by referencing other data, such as anti-virus rules or one or more control lists.

If in the decision step 100 it is determined that the first rule is not applicable, decision step 104 determines whether there is another applicable rule. If there are fifteen rules within the set of rules that are applicable to the communication under consideration, steps 98, 100 and 104 will be repeated fifteen times or until the information set matches one of the rules.

Preferably, there is a default rule at the end of each set of rules in the rules base. Referring briefly to FIG. 5, the GUI 68 shows six rules in its set of outgoing rules in the upper portion 72 of the GUI. The sixth and final rule to be applied is the default rule that disallows outgoing communications that are not specifically allowed within the set. Alternatively, the default rule may be to allow the communication.

After all of the appropriate rules have been applied, the optional decision step 106 is executed. The access rules of the rules base are pre-parsed to identify which rules can be applied at the basic connection time and which rules need to be held-over for application once the connection is completed and data is flowing. If, for a particular node-to-node transmission, it is determined that no rules need to be held-over, the default rule can be applied at connection time, assuming that there is no prior rule that provides an affirmative response at step 100. However, if access rules need to be applied once data is flowing, the default rule is applied with the held-over rules. Thus, when there are access rules that relate to data flow, the connection is allowed to be completed, unless it is determined at step 100 that the connection is a restricted one. If it is determined at step 106 that rules have been held-over, the packets continue to be assembled at step 94 and the process repeats itself in order to apply the held-over rules. On the other hand, if there are no held-over rules, the process returns to the step 92 of identifying packets of a specific communication. However, the implementation, and even existence, of step 106 is not critical to the invention.

It is worth noting that various changes and modifications can be made to the above examples to achieve the same results, while remaining within the scope of the method and system. For example, access management control can be performed on a generic gateway machine, as opposed to a firewall, a proxy server or a passive workstation.

What is claimed:

1. A method of providing access control to resources of a network comprising steps of:

monitoring network traffic, including receiving data packets transmitted to and from nodes of said network such that receptions of said data packets are non-intrusive with respect to traffic flow of said network;

with respect to individual node-to-node transmissions within said network, assembling pluralities of said received data packets specific to said individual node-to-node transmissions, thereby forming an assembled multi-packet communication for each of said node-to-node transmission based upon said assembled multi-packet communications, identifying source nodes and destination nodes and contextual information for said individual node-to-node transmissions; and applying access rules to said assembled multi-packet communications in determinations of whether said individual node-to-node transmissions are restricted transmissions, including basing said determinations on said identifying said source and destination nodes and said contextual information.

2. The method of claim 1 wherein said steps of receiving and assembling said data packets are executed at a network element that is outside of direct paths from said source nodes to said destination nodes of said node-to-node transmissions.

3. The method of claim 2 wherein said steps of receiving and assembling said data packets are executed at a workstation that is dedicated to providing access control to said resources.

4. The method of claim 1 further comprising a step of determining whether to disallow said individual node-to-node transmissions based upon said step of applying said access rules.

5. The method of claim 1 further comprising a step of generating said access rules in a form of a rules base that includes a first set of rules specific to individual node-to-node transmissions having a destination node that is outside of said network and further includes a second set of rules specific to individual node-to-node transmissions having both of said source and destination nodes as network elements of said network, said step of applying said access rules including applying said first and second sets to user-generated information that is determined from said assembled multi-packet communications.

6. The method of claim 5 wherein said step of generating said access rules includes forming said first set of rules to be specific to communications via the global communications network referred to as the Internet and includes forming said second set of rules to be specific to communications that are on a same side of a firewall of said network.

7. The method of claim 6 wherein said step of assembling said received data packets is enabled for at least one of Transmission Control Protocol (TCP) services and User Datagram Protocol (UDP) services.

8. The method of claim 5 wherein said step of generating said access rules further comprises basing at least some of said access rules upon time, such that said determinations of whether said individual node-to-node transmissions are restricted transmissions are time-dependent determinations.

9. The method of claim 1 wherein said step of identifying said source and destination nodes and said contextual information includes collecting ISO Layer 7 data for use in said step of applying said access rules.

10. The method of claim 1 further comprising a step of executing first-line network intrusion detection at an entry point of said network, such that transmissions from nodes that are external to said network are subject to first-line network intrusion restriction rules, said first-line network intrusion detection being independent of said step of applying said access rules.

11. A method of providing access control to resources that are internal to and external of a network of nodes, including computing devices of users of said network, said method comprising steps of:

generating a rules base related to restricting access to said resources by said nodes of said network, including forming a first set of rules specific to access to external resources and a second set of rules specific to access to internal resources;

monitoring transmissions that include one of said computing devices;

acquiring information regarding each said transmission, including determining information relating to at least Layers 2, 3 and 7 of the ISO model; and applying said rules base to said acquired information to detect transmissions in which access to said resources is restricted by said rules base, including initiating a predetermined action in response to detecting that a specific transmission relates to an access that is restricted.

12. The method of claim 11 wherein said steps of monitoring said transmissions and acquiring said information are executed non-intrusively, such that transmissions for which accesses are restriction-free occur without impact on transmission traffic within said network.

13. The method of claim 12 wherein said steps of monitoring said transmissions and acquiring said information include receiving and assembling data packets at a node of said network, thereby forming a multi-packet communication for each said transmission, said node being outside of direct paths of said transmissions to and from said user computing devices.

14. The method of claim 11 wherein said step of acquiring information relating to Layer 7 includes assembling data packets received at said network via the Internet and includes assembling data packets that are exchanged between network elements of said network, said step of acquiring information further including determining user-generated contextual data relating to sources and destinations of said data packets.

15. A system for providing access control to resources of a network comprising:

a plurality of nodes, including computing devices;

means for non-intrusively intercepting data packets to and from said nodes such that said intercepting is substantially transparent to packet flow within said network;

means for identifying said data packets of discrete transmissions and assembling said data packets;

means for determining sources and destinations of said discrete transmissions and determining user-generated contextual information contained therein;

a rules base store having a plurality of rules relating to controlling access to said resources of said network; and means for controlling said access based upon matching said rules to said sources, destinations and user-generated contextual information from said means for determining.

16. The system of claim 15 wherein said means for non-intrusively intercepting said data packets is positioned within said network and is operative to receive data packets transmitted between said nodes of said network.

17. The system of claim 16 wherein said means for non-intrusively intercepting is one of a workstation or a server dedicated to access control within said network, said workstation or server being on a same side of a firewall as said computing devices of said network.

18. The system of claim 16 wherein said rules base store includes a first set of rules specific to transmissions to destinations outside of said network and includes a second set of rules specific to transmissions having sources and destinations that are nodes of said network.

* * * * *

EX PARTE REEXAMINATION CERTIFICATE (6438th)

United States Patent
Cunningham et al.

(10) Number: US 6,219,786 C1
(45) Certificate Issued: Sep. 16, 2008

(54) METHOD AND SYSTEM FOR MONITORING AND CONTROLLING NETWORK ACCESS

(75) Inventors: Mark Cunningham, Leek (GB); Andrew Trevarrow, Withington (GB)

(73) Assignee: Surfcontrol, Inc., Scotts Valley, CA (US)

Reexamination Request:
No. 90/006,334, Jul. 24, 2002

Reexamination Certificate for:
Patent No.: 6,219,786
Issued: Apr. 17, 2001
Appl. No.: 09/150,264
Filed: Sep. 9, 1998

(51) Int. Cl.
*H04L 12/26* (2006.01)
*H04L 29/06* (2006.01)

(52) U.S. Cl. .................. 713/152; 713/153; 709/229; 726/11

(58) Field of Classification Search .................. None
See application file for complete search history.

(56) References Cited

U.S. PATENT DOCUMENTS

| | | | | |
|---|---|---|---|---|
| 5,119,252 A | * | 6/1992 | Kamata et al. | 360/99.06 |
| 5,124,984 A | | 6/1992 | Engel | 370/94.1 |
| 5,414,833 A | | 5/1995 | Hershey et al. | 395/575 |
| 5,983,270 A | | 11/1999 | Abraham et al. | 709/224 |
| 5,987,606 A | | 11/1999 | Cirasole et al. | 713/200 |
| 6,012,832 A | * | 1/2000 | Saunders et al. | 235/375 |
| 6,185,681 B1 | * | 2/2001 | Zizzi | 713/165 |
| 6,377,577 B1 | * | 4/2002 | Bechtolsheim et al. | 370/392 |

FOREIGN PATENT DOCUMENTS

| EP | 0658837 | 12/1994 |
|---|---|---|
| EP | 0748095 | 5/1996 |
| WO | 98/28690 | 7/1998 |

OTHER PUBLICATIONS

Stein, Lincoln D., "Web Security—a step by step reference guide," 1997, Addison–Wesley, pp. 387–415.*
Stevens, W. Richard, TCP/IP Illustrated, vol. 1, pp. 1–12, 29–30, 143–150, 1994.*
"Check Point software Brings 'Write Once, Manage Everything' Functionality to Enterprise Security Management," http://www.checkpoint.com/press/1997/osm1.
Lodin, Steven W., et al., "Firewalls fend off invasions from the Net," *IEEE Spectrum*, 0018–9235/98, Feb. 1998, pp. 26–34.

* cited by examiner

*Primary Examiner*—Ovidio Escalante

(57) ABSTRACT

A method and system for monitoring and controlling network access includes non-intrusively monitoring network traffic and assembling data packets that are specific to individual node-to-node transmissions in order to manage network access both inside and outside of a network. A rules base is generated to apply at either or both of the connection time and the time subsequent to connection. With regard to a particular node-to-node transmission, the data packets are assembled to identify the source and destination nodes, as well as contextual information (i.e., ISO Layer 7 information). The access rules are applied in a sequential order to determine whether the transmission is a restricted transmission. The rules are maintained in a single rules base for the entire network and are distributed to each monitoring node. Any of the protocols in the suite of TCP/IP protocols can be managed. The result of an analysis against the rules base causes a connection attempt to be completed or denied, a previously established connection to be broken, logging to occur, or a combination of these and other actions. Data collected during connection attempts or during a connection's lifetime may be passed to a third-party hardware or software component in order for independent validation to take place. Traffic monitoring and access management can be executed at a node other than a choke point of the network.

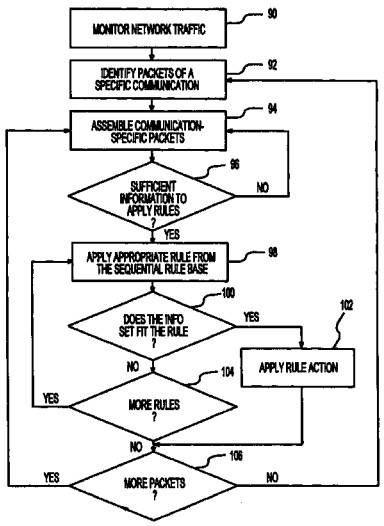

US 6,219,786 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2, 9, 11, 13 and 15 are determined to be patentable as amended.

Claims 3–8, 10, 12, 14 and 16–18, dependent on an amended claim, are determined to be patentable.

1. A method of providing access control to resources of a network comprising steps of:
   monitoring network traffic *of data packets in which each said data packet includes identifications of source and destination nodes and includes contextual information,* including receiving *said* data packets transmitted to and from nodes of said network such that receptions of said data packets are non-intrusive with respect to traffic flow of said network;
   with respect to individual node-to-node transmissions within said network, assembling pluralities of said received data packets specific to said individual node-to-node transmissions, thereby forming an assembled multi-packet communication for each of said node-to-node transmission, *wherein said node-to-node transmissions are each in a form of an original composite signal separated into a plurality of said data packets for full and final reassembly at a destination node identified in said data packets of said node-to-node transmission;*
   based upon said assembled multi-packet communications, identifying source nodes and destination nodes and contextual information for said individual node-to-node transmissions; and
   applying access rules to said assembled multi-packet communications in determinations of whether said individual node-to-node transmissions are restricted transmissions, including basing said determinations on said identifying said source and destination nodes and said contextual information, *wherein said steps of monitoring, assembling, identifying and applying are executed non-intrusively with respect to said restricted transmissions and with respect to node-to-node transmissions determined to be unrestricted transmissions upon applying said access rules to said assembled multi-packet communications of said unrestricted transmissions, such that traffic flow of data packets from said source nodes to said destination nodes is unaffected by said steps.*

2. The method of claim 1 wherein said steps of receiving and assembling said data packets are executed at a network element that is outside of direct paths from said source nodes to said destination nodes of said node-to-node transmissions, *thereby enabling said non-intrusive receptions of said data packets.*

9. The method of claim 1 wherein said step of identifying said source and destination nodes and said contextual information includes collecting ISO Layer 7 data for use in said step of applying said access rules, *each said data packet being an Ethernet packet.*

11. A method of providing access control to resources that are internal to and external of a network of nodes, including computing devices of users of said network, said method comprising steps of:
   generating a rules base related to restricting access to said resources by said nodes of said network, including forming a first set of rules specific to access to external resources and a second set of rules specific to access to internal resources;
   monitoring transmissions that include one of said computing devices;
   acquiring information regarding each said transmission, including determining information relating to at least Layers 2, 3 and 7 of the ISO model, *wherein said steps of monitoring and acquiring include receiving and assembling data packets to form a multi-packet communication for each said transmission, said acquiring including using said multi-packet communications to determine said information;* and
   applying said rules base to said acquired information to detect transmissions in which access to said resources is restricted by said rules base, including initiating a predetermined action in response to detecting that a specific transmission relates to an access that is restricted.

13. The method of claim 12 wherein said steps of monitoring said transmissions and acquiring said information include receiving and assembling *said* data packets at a node of said network, [thereby forming a multi-packet communication for each said transmission,] said node being outside of direct paths of said transmissions to and from and said user computing devices.

15. A system for providing access control to resources of a network comprising:
   a plurality of nodes, including computing devices;
   means for non-intrusively intercepting data packets to and from said nodes such that said intercepting is substantially transparent to *continuous* packet flow within said network, *said data packets being intact packets consistent with a packet protocol for transmissions within said network;*
   means for identifying said data packets of discrete transmissions and assembling said data packets, *said means for identifying and assembling having an output of an assembled multi-packet communication for each said discrete transmission, said means for identifying and assembling being non-intrusive with respect to said continuous packet flow of said data packets within said network;*
   means *connected to said output* for determining sources and destinations of said discrete transmissions and determining user-generated contextual information contained [therein] *within said multi-packet communications*;
   a rules base store having a plurality of rules relating to controlling access to said resources of said network; and
   means for controlling said access based upon matching said rules to said sources, destinations and user-generated contextual information from said means for determining, *said means for controlling being enabled to apply rule actions to those said discrete transmissions for which said matching indicates a restriction, said means for controlling further being enabled to allow continuous flow of packets of said discrete transmissions to remain unhindered when said rules indicate an unrestricted transmission on a basis of said mutipacket communications.*

* * * * *